United States Patent [19]

Focke et al.

[11] Patent Number: 5,430,994
[45] Date of Patent: Jul. 11, 1995

[54] APPARATUS FOR FEEDING PACKS, ESPECIALLY BAG PACKS, TO A COLLECTIVE PACKER

[75] Inventors: Heinz Focke, Verden; Wolfgang Heinzig, Apen, both of Germany

[73] Assignee: Focke & Co. (GmbH & Co.), Verden, Germany

[21] Appl. No.: 58,717

[22] Filed: May 10, 1993

[30] Foreign Application Priority Data

May 14, 1992 [DE] Germany .................. 42 15 642.4

[51] Int. Cl.[6] .............................................. B65B 57/00
[52] U.S. Cl. ................................ 53/493; 53/168; 53/171; 198/447; 198/347.4; 198/435
[58] Field of Search ................. 53/154, 168, 171, 537, 53/540, 542, 543, 493; 198/347.4, 435, 447

[56] References Cited

U.S. PATENT DOCUMENTS

| 1,969,276 | 8/1934 | Pevear .................. 198/347.4 X |
| 3,358,831 | 12/1967 | Cothrell ................ 198/347.4 X |
| 3,902,587 | 9/1975 | Checcucci ................. 53/537 X |
| 4,124,967 | 11/1978 | Beer et al. . |
| 4,284,187 | 8/1981 | Kramer et al. ............... 53/493 X |
| 4,590,743 | 5/1986 | Hardage .................... 53/542 X |
| 4,676,050 | 6/1987 | Odenthal ................... 53/542 X |
| 4,718,534 | 1/1988 | Harper . |
| 4,776,148 | 10/1988 | Mingozzi . |
| 4,864,801 | 9/1989 | Fallas ..................... 53/542 X |
| 4,867,299 | 9/1989 | Fukuoka et al. ............... 198/435 |
| 5,038,915 | 8/1991 | Delsanto . |
| 5,078,255 | 1/1992 | Haley . |

FOREIGN PATENT DOCUMENTS

| 7231 | 7/1979 | European Pat. Off. . |
| 5740 | 12/1979 | European Pat. Off. . |
| 87688 | 9/1966 | France . |
| 2377938 | 8/1978 | France . |
| 2025185 | 11/1971 | Germany . |
| 88057 | 11/1972 | Germany . |
| 2319805 | 11/1973 | Germany . |
| 2346407 | 3/1974 | Germany . |
| 2702339 | 7/1978 | Germany . |
| 2009610 | 11/1979 | Germany . |
| 3814911 | 11/1989 | Germany . |
| 3915217 | 7/1990 | Germany . |
| 3938719 | 5/1991 | Germany . |
| 4114251 | 11/1991 | Germany . |
| 4022120 | 1/1992 | Germany . |
| 2103168 | 2/1983 | United Kingdom . |
| 2244039 | 5/1990 | United Kingdom . |

Primary Examiner—Linda B. Johnson
Attorney, Agent, or Firm—Sughrue, Mion, Zinn, Macpeak & Seas

[57] ABSTRACT

An apparatus for transferring bag packs (10) containing sensitive loose material to a collective packer for the introduction of the packs into a carton or the like. To compensate for the difference in performance rates of a production machine (bag packer) for the packs (10) and the collective packer, there is provided a conveying device (17) with at least two conveyor belts (18, 19) which act as compensating conveyors. The packs (10) are fed to a special collecting station (16) by the conveying device (17). This collecting station comprises an intermediate band (35) and a group band (43). In the region of the intermediate band (35), the packs (10) are spaced out at a distance so they can be detected. In the region of the group band (43), a pack group (11) is formed from packs (10) lying tightly next to one another.

2 Claims, 3 Drawing Sheets

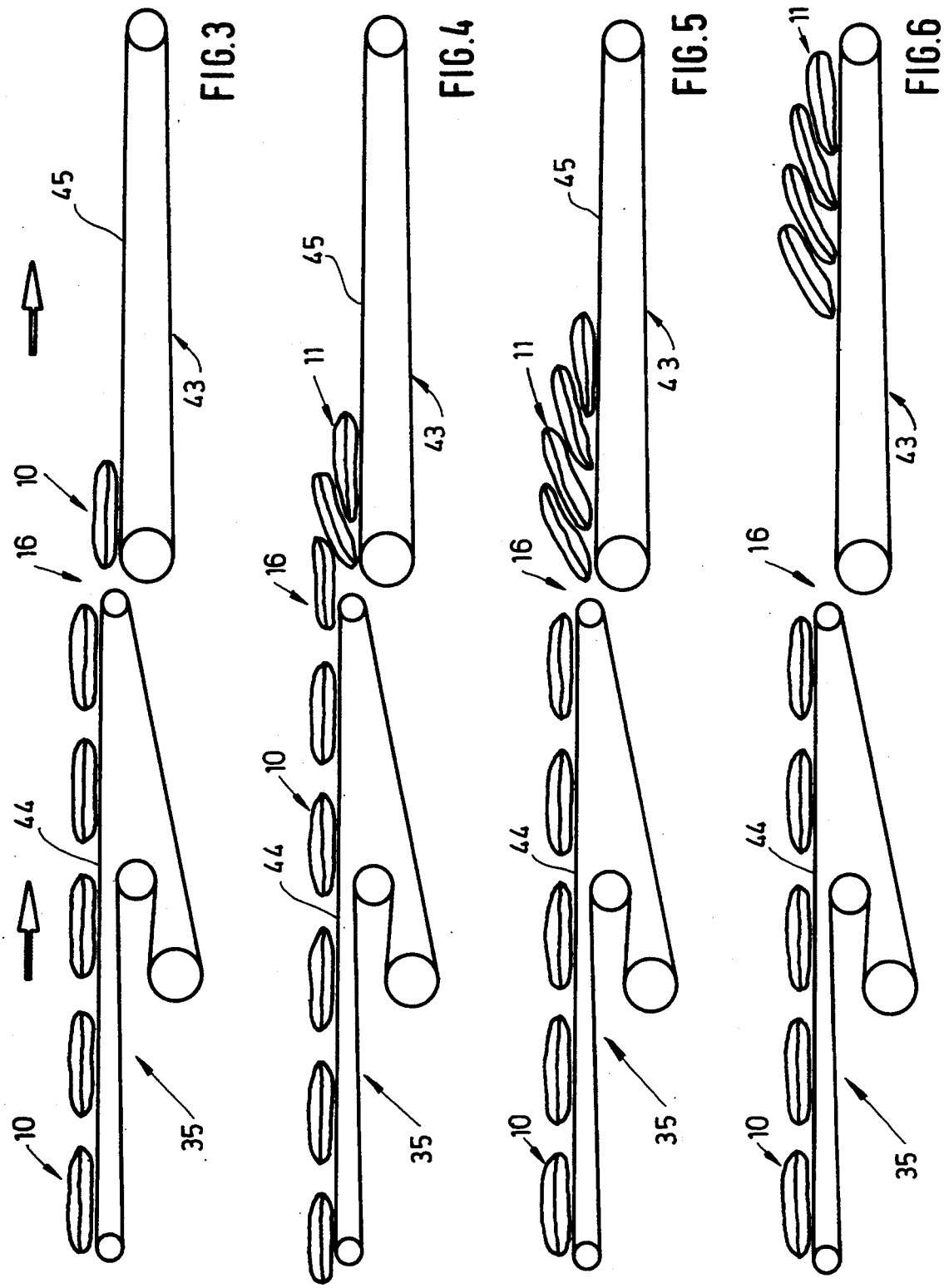

APPARATUS FOR FEEDING PACKS, ESPECIALLY BAG PACKS, TO A COLLECTIVE PACKER

BACKGROUND OF THE INVENTION

The invention relates to an apparatus for feeding packs, especially bag packs, to a collective packer (carton packer) for the packing of packs in large containers (cartons) in groups or layers, whereby the packs are delivered individually in succession from a production machine, especially from a tubular bag forming machine.

The invention is directed to the handling of especially bag packs containing pressure sensitive loose material, such as crisp savoury food products (potato crisps), in conjunction with the introduction of these packs into collective packs, especially cartons. A solution for the filling of such packs into a carton has been suggested in DE-A-40 22 120. The invention is directed primarily—but not exclusively—to the transport of packs to a carton packing machine or another collecting station for the packs.

The invention is based on the finding that, because of the pressure sensitivity of the packs or pack contents, it is not possible to collect the packs in the form of a relatively long accumulated row. Nevertheless, it is required to form groups of packs which correspond to a layer or at least a part layer within the carton.

SUMMARY OF THE INVENTION

Accordingly, it is the object of the invention to propose a transport system for packs which has a high capacity and guarantees a careful treatment of the packs but still permits the forming of pack groups.

To attain this object, the apparatus according to the invention is characterized in that the packs are transportable to the collective packer by at least two (endless) conveyors, and in that the conveyors are alternately loadable and unloadable.

According to the invention, the conveyors take the form of two conveyor belts which, in alternation, receive packs at one end of a conveying strand and transfer the packs at the other end. Thus, in accordance with the invention, the one belt is continuously fed with packs at one end of the transport path, whereas at the same time the other conveyor belt is unloaded by way of a transfer of the packs at the other end of the conveying path.

The conveyor belts for the transport of the packs can be driven at differing conveying speeds. As a result, it is possible to transport the packs without any congestions, even though a precise synchronous travel between the production machine (tubular bag forming machine) and the collective packer does not exist or is not required.

According to a further proposal of the invention, the two conveyor belts are disposed on a common supporting frame which is movable, especially tiltable, in response to the transport process in order to alternately move the one and the other conveyor belt into the loading or unloading position.

A collecting station which adjoins the conveyor belts on the transfer side is designed in a special way according to the invention. This collecting station comprises at least two adjoining band conveyors for the packs. The first band conveyor receives the packs from the conveyor belts and effects the forming of gaps between the packs as a result of an appropriate relative speed (intermediate band). This band is followed by a group band which forms and positions the pack group which is to be fed to the collective packer or the like.

BRIEF DESCRIPTION OF THE DRAWINGS

Further details of the invention are readily apparent from the exemplary embodiment which will be described hereinafter with reference to the drawings, in which:

FIG. 3 show a detail of the apparatus, in particular a to collecting station, at different stages, on an FIG. 6 enlarged scale.

DESCRIPTION OF A PREFERRED EMBODIMENT

The apparatus shown in t he form of an exemplary embodiment serves for handling packs 10, which are delivered from a production machine, especially a tubular bag forming machine, and which are assembled to pack groups 11 which are introduced into large containers, especially cartons. The packs 10 are preferably bag packs containing pressure sensitive loose material such as potato crisps.

Figure 1:
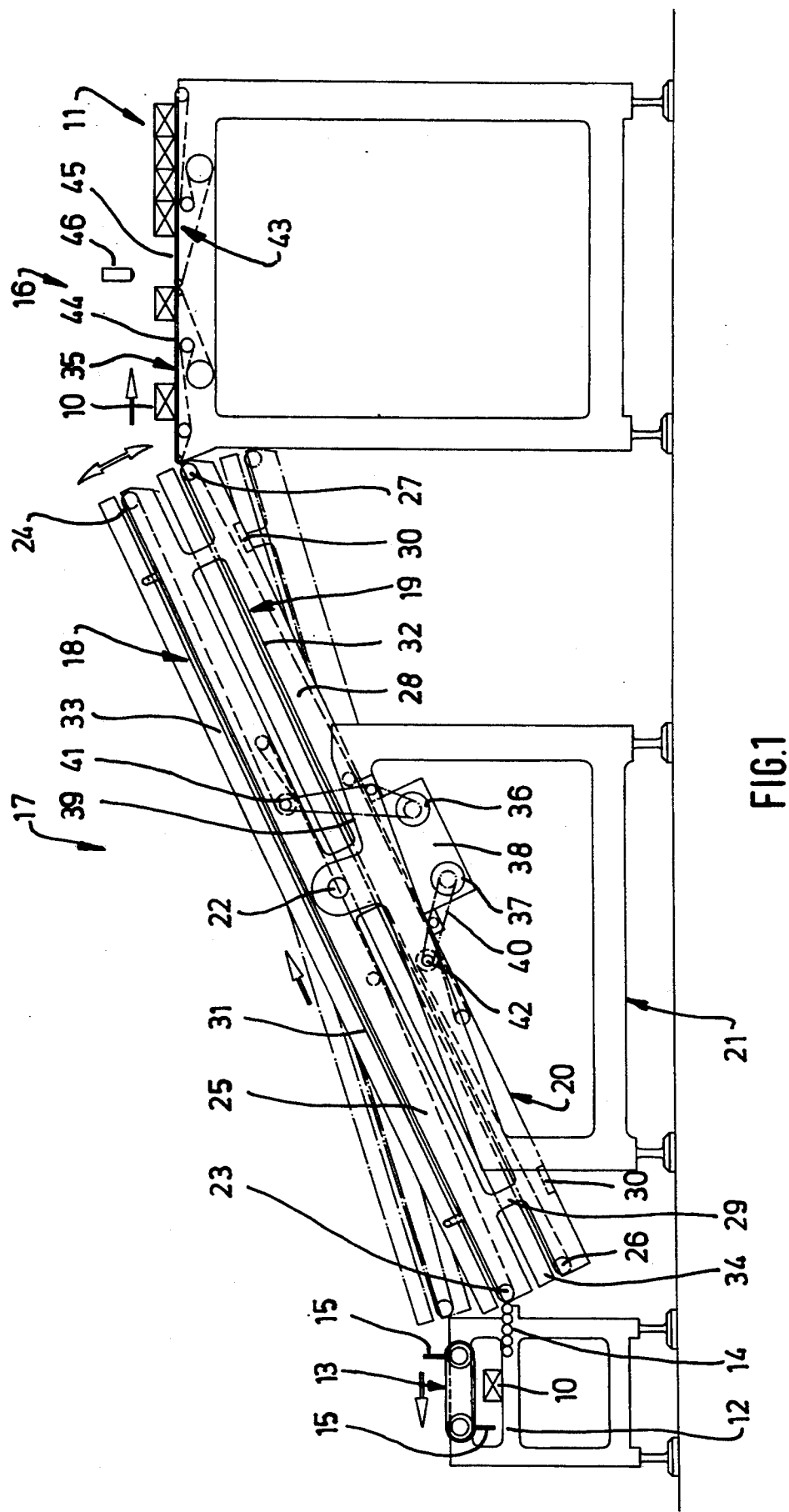
FIG. 1 is a schematic side view of an apparatus for transporting packs.

The packs 10 which come from the production machine are delivered one after the other on a pack conveyor 12 which, in the representation of FIG. 1, extends perpendicularly to the image plane. The packs 10 are removed from this pack conveyor 12 by a transverse conveyor 13 in the transverse direction and are transferred to a joining conveyor, in particular a roller conveyor 14. In this case, the transverse conveyor 13 takes the form of an endless belt, which has driver members 15 which engage one pack each.

The packs 10 are delivered continuously, in accordance with the performance rate of the tubular bag forming machine, in spaced relationship on the pack conveyor 12. From time to time, there may occur gaps or greater distances between the packs, for example when defective packs have been removed. The object is to feed the packs 10 to a collecting station 16 for the forming of the pack groups 11. In this process, differences between the delivery of the packs 10 and the discharge of the packs from the collecting station 16 which depends on the performance rate of the collective packer are to be compensated in such a way that there are no accumulations of pack rows.

A conveying device 17 which is designed in a special way is disposed between the pack conveyor 12 and the collecting station 16. This conveying device is designed such that it is able to compensate for the differences between the delivery and the discharge of packs 10.

For this purpose, the conveying device 17 has two conveyors, in particular conveyor belts 18 and 19. These conveyor belts are held by a common supporting frame 20. The supporting frame 20 rests on a machine frame 21. The supporting frame 20 is movable, as a unit together with the conveyor belts 18, 19, relative to the machine frame 21, namely tiltable in a vertical plane. For this purpose, the supporting frame 20 is connected to the machine frame 21 in an (approximately) central pivot bearing 22.

The conveyor belts 18, 19 are disposed in or at the supporting frame 20 on top of one another. Deflecting rollers 23, 24 of the upper conveyor belt 18 are held by upper lateral supporting struts 25. Deflecting rollers 26, 27 of the lower conveyor belt 19 are attached to lateral supporting struts 28. The supporting struts 25 and 28 are connected to one another by upright webs 29 and crossbeams 30.

The packs 10 are transferred via the horizontal roller conveyor 14 alternately to the one or the other conveyor belt 18, 19. An upper conveying strand 31, 32 of the conveyor belts transports the packs 10 to the collecting station 16. The conveying strand 31 and 32 is associated with lateral guides 33, 34.

The conveyor belts 18, 19 are moved alternately into a receiving position and a discharge position for packs 10 by means of pivoting the supporting frame 20. In the representation of FIG. 1, the upper conveyor belt 18 is in the receiving position. The deflecting roller 23 is disposed adjacent to the roller conveyor 14. The packs 10 are transferred from this roller conveyor 14 to the conveying strand 31 of the conveyor belt 18.

The arrangement is such that, at the opposite side of the conveying device 17, the lower conveyor belt 19 at the same time adjoins the collecting station 16. The deflecting roller 27 for the conveying strand 32 is located directly adjacent to a conveyor of the collecting station 16, in particular an intermediate band 35 which takes the form of a band conveyor. This means that the upper conveyor belt 18 only receives packs 10 while the lower conveyor belt 19 exclusively transfers packs 10.

The arrangement is such that the conveying device 17 is an inclined conveyor. The conveyor belts 18, 19 are directed at an acute angle, such that the conveying strands 31, 32 convey in an upward direction. The collecting station 16 is located at a substantially higher level than the pack conveyor 12. The supporting frame 20 is movable by way of clockwise and anticlockwise pivoting by an adjusting means, or example a pressure medium cylinder, between the position indicated by solid lines and the position indicated by dash-dot lines in FIG. 1.

Each conveyor belt 18, 19 is driven separately, in particular at a speed which is adjustable in response to the delivery and transfer of packs 10. Each conveyor belt 18, 19 is associated with a driving motor 36, 37. The two driving motors 36, 37 are in this case attached to a common holder 38 which is connected to the supporting frame 20. The driving motors 36, 37 act upon driving rollers 41, 42 of the conveyor belts 18, 19 via driving belts 39, 40 (toothed belts).

The collecting station 16 is designed in a special way as well. The intermediate band 35 is directly adjoined by a group band 43. Conveying strands 44 and 45 of intermediate band 35 and group band 43 extend horizontally and adjoin one another. Intermediate band 35 and group band 43 are drivable independently of one another and at different conveying speeds.

The apparatus which has been described in the foregoing operates as follows:

In the position illustrated in FIG. 1, the incoming packs 10 are transferred one after the other onto the conveyor belt 18. During this process, the conveyor belt 18 is driven continuously at such a speed that the packs 10 are transported on the conveying strand 31 in an upward direction in a configuration in which there are no gaps or only small gaps between the packs. Meanwhile, the packs 10 which have been collected on the lower conveyor belt 19 are fed to the collecting station 16, in particular the intermediate band 35 by means of appropriate transport movements of the conveyor belt 19. The respective conveyor belt which is located in this unloading position—conveyor belt 19 in FIG. 1—is driven at a slightly higher speed than the other conveyor belt 18 which is located in the loading position.

After the conveyor belt 19 has been emptied, the supporting frame 20 is pivoted clockwise, such that the lower empty conveyor belt 19 reaches the loading position. In this position, the conveying strand 32 adjoins the roller conveyor 14. At the same time, the upper conveyor belt 18 has reached the unloading position, in which the conveying strand 31 adjoins the intermediate belt 35. The upper conveyor belt 18 is now driven at an appropriately higher speed and is unloaded. The arrangement may be such that, when the conveyor belts 18, 19 are filled, the packs 10 do not occupy the entire conveyor belts 18, 19 right up to the deflecting roller 24 or 27, but only a portion of the respective belt.

The intermediate band 35 has to space out the packs 10 which mostly arrive in a closely packed configuration. For example, they may be spaced at a distance of 2 to 3 cm. The intermediate band 35 is therefore driven at an appropriately higher speed than the adjoining conveyor belt 18, 19.

The distance between the packs 10 in the region of the intermediate band 35 is required so that the packs 10 can be detected by a sensing means, in the present case by an optoelectric sensor 46, and can be counted.

The adjoining group band 43 is driven at a lower conveying speed or stands still temporarily. First of all, a number of packs 10 which corresponds to the pack group 11 (pack layer) is received from the intermediate band 35 as a result of an appropriate intermittent conveying movement of the group band 43.

The individual stages during the forming of the pack group 11 on the group band 43 are illustrated in FIGS. 3 to 6. In order to transfer the packs 10 from the intermediate band 35 to the group band 43 in an unproblematic manner, the group band is disposed slightly lower than the intermediate band 35. The conveying strand 45 of the group band 43 is downwardly offset relative to the conveying strand 44.

The packs 10 can have different configurations on the group band 43, that is to say within the pack group 11. They may either rest tightly against one another, or they may be positioned in spaced relationship or in a shingle-like manner as illustrated in FIGS. 3 to 6. This configuration of the packs 10 results from the relative speed of the group band 43 compared to the intermediate band 35. The group band 43 is driven intermittently, in accordance with the receipt of packs 10.

Figure 2:
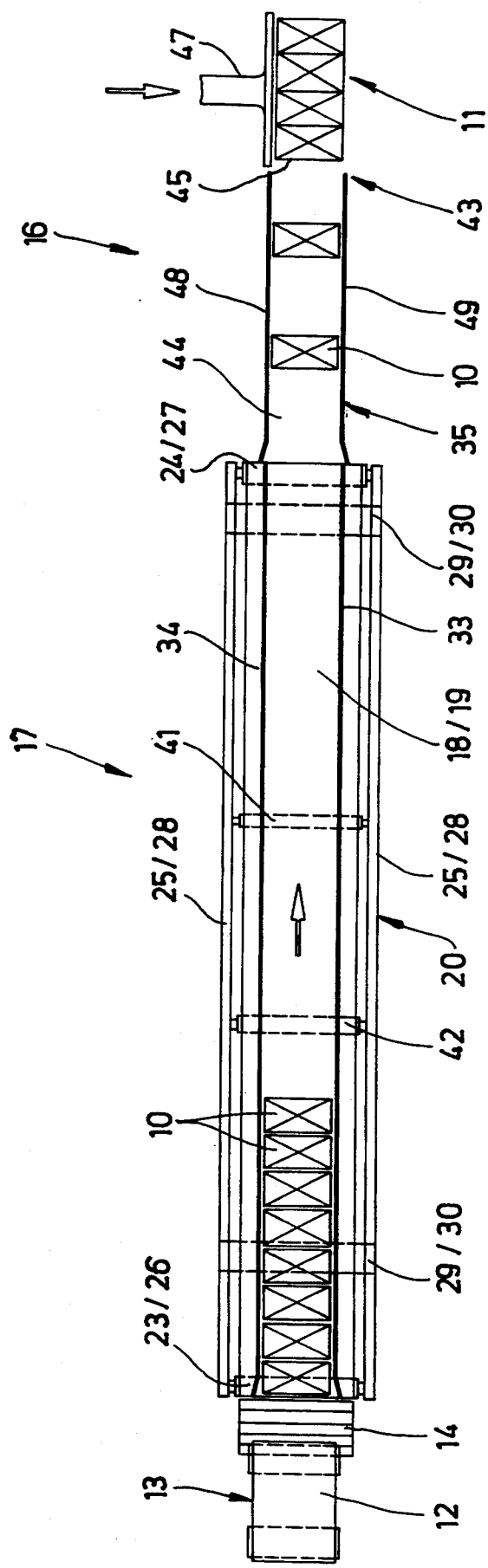
FIG. 2 is a plan view of the apparatus of FIG. 1.

As soon as the pack group 11 is complete, it is transported into an accurate transfer position (as shown in FIGS. 1 and 2) by means of an appropriate acceleration of the group band 43. In this transfer position, the complete pack group 11 is discharged by a pusher 47 in the transverse direction.

Intermediate band 35 and group band 43 are delimited by common lateral guides 48, 49.

The illustrated apparatus is particularly suitable for bag packs. These are transported in the region of the conveying device 17 with their longitudinal dimension directed transversely relative to the conveying direction. The width of the packs 10 in the conveying direction may be between 10 and 25 cm. The conveyor belts 18, 19 are driven at a speed from between 12 and 20 m/min. The conveying device 17 may have a length of 3 m, for example. Between 12 and 30 packs may be located on a filled conveyor belt 18, 19. With an overall capacity of 120 packs 10 per minute, for example, the conveying device 17 is thus switched over in intervals of a few seconds.

What is claimed is:

1. In an apparatus for feeding bag packs (10) to a carton packer for the packing of packs in large cartons in groups or layers, whereby the packs (10) are delivered individually in succession from a tubular bag forming machine, the improvement comprising:
   a) means for transporting the packs (10) to a collecting station (16), said means including two conveyor belts (18, 19) which are alternately movable to a loading and an unloading position to be alternately loadable with packs (10) and unloadable, whereby one of said conveyor belts receives packs at one end in the loading position, while the other conveyor belt discharges packs (10) at the other end in the unloading position;
   b) means for continuously driving the two conveyor belts (18, 19) so that a respective conveyor belt which is located in the unloading position is driven at a higher speed than the conveyor belt which is located in the loading position;
   c) an intermediate band (35) forming part of the collecting station and adjoining the respective conveyor belt that is located in the unloading position, and means for driving said intermediate band (35) at a higher speed than said respective conveyor belt so that the packs (10) are spaced apart on the intermediate band (35);
   d) a group band (43) adjoining said intermediate band (35) and receiving packs delivered from said intermediate band, and means for discontinuously driving said group band (43) so that the packs (10) delivered from the intermediate band (35) are received in a closely packed configuration for forming a pack group (11).

2. The apparatus as claimed in claim 1, further comprising a pivotably mounted supporting frame (20) supporting the conveyor belts (18, 19), and means for pivoting the conveyor belt, which is located in the loading position, into the unloading position, and, simultaneously, the conveyor belt, which is located in the unloading position, into the loading position, so that the conveyor belts (18, 19) are pivoted immediately after discharging the conveyor belt (18, 19) located in the unloading position.

* * * * *